United States Patent
Lahr et al.

(10) Patent No.: US 12,482,902 B2
(45) Date of Patent: Nov. 25, 2025

(54) BALANCED CURRENT COLLECTOR PLATE

(71) Applicant: GM GLOBAL TECHNOLOGY OPERATIONS LLC, Detroit, MI (US)

(72) Inventors: Derek Frei Lahr, Ann Arbor, MI (US); Konrad Michael Brown, Allen Park, MI (US); Chinmaya Patil, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 488 days.

(21) Appl. No.: 18/072,815

(22) Filed: Dec. 1, 2022

(65) Prior Publication Data

US 2024/0186658 A1 Jun. 6, 2024

(51) Int. Cl.
*H01M 50/509* (2021.01)
*H01M 50/213* (2021.01)
*H01M 50/559* (2021.01)
*H01M 50/583* (2021.01)

(52) U.S. Cl.
CPC ....... *H01M 50/509* (2021.01); *H01M 50/213* (2021.01); *H01M 50/559* (2021.01); *H01M 50/583* (2021.01); *H01M 2220/20* (2013.01)

(58) Field of Classification Search
CPC ....... H01M 2200/103; H01M 2220/20; H01M 50/213; H01M 50/249; H01M 50/503; H01M 50/509; H01M 50/559; H01M 50/583; Y02E 60/10
See application file for complete search history.

(56) References Cited

U.S. PATENT DOCUMENTS

2020/0343516 A1* 10/2020 Harris ................. H01M 10/613
2022/0190452 A1* 6/2022 Botadra ............. H01M 50/213

* cited by examiner

*Primary Examiner* — Victoria H Lynch
(74) *Attorney, Agent, or Firm* — CANTOR COLBURN LLP

(57) ABSTRACT

Embodiments include a battery pack having a balanced current collector plate configured to connect a plurality of battery cells to one another and an electric vehicle including the same. The balanced current collector plate includes a terminal and a plurality of cell connection regions, each corresponding to one of the plurality of battery cells. Each of the plurality of cell connection regions includes one or more sidewalls, a cell connection tab that is configured to contact a terminal of a battery cell, and a cell fuse that is configured to electrically connect the cell connection tab to the balanced current collector plate. The geometry of each of the plurality of cell connection regions is configured to minimize a difference among the current draw between each of the plurality of battery cells and the terminal.

20 Claims, 7 Drawing Sheets

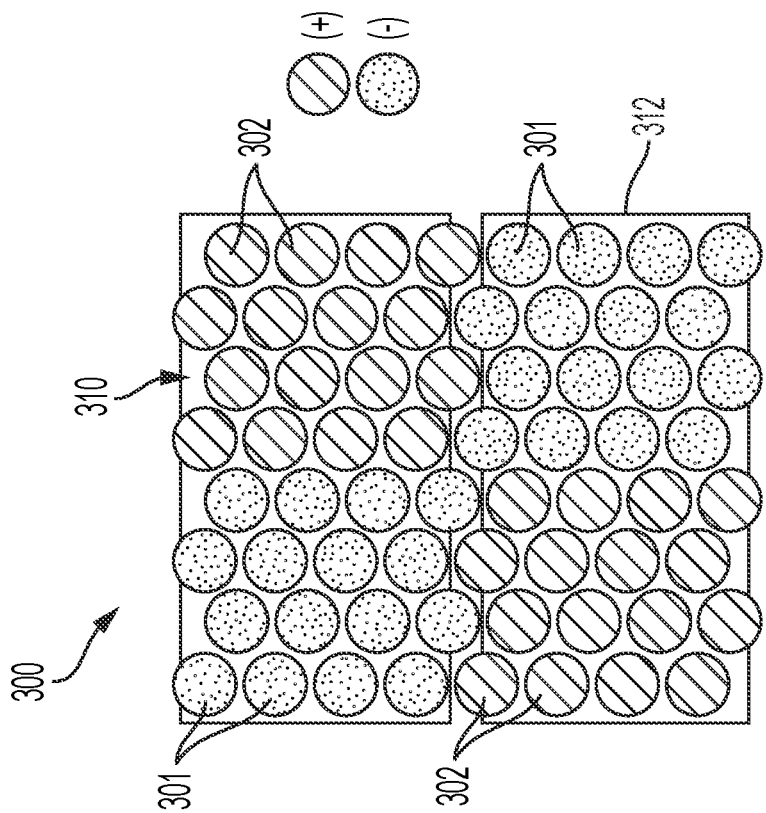
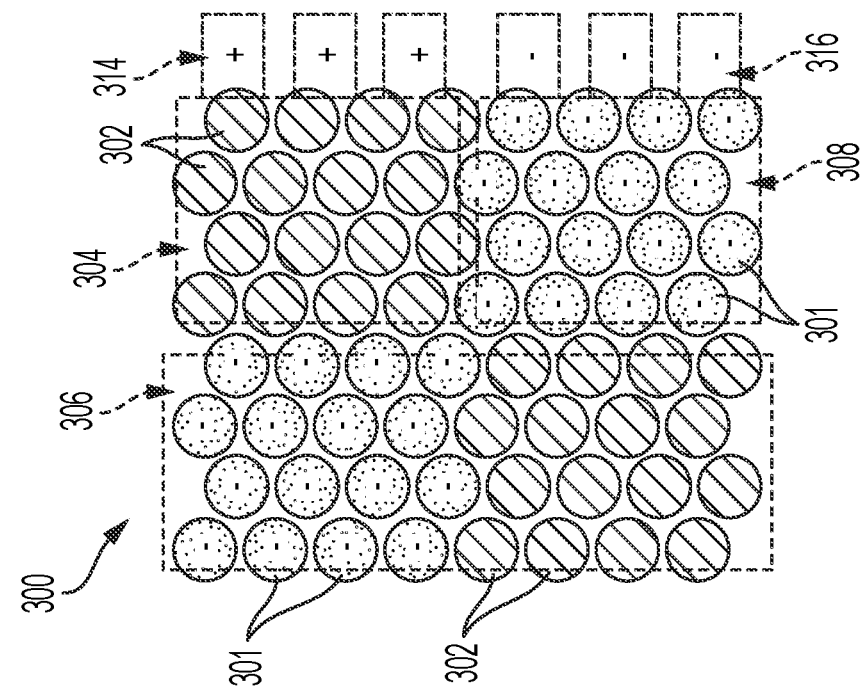
FIG. 3B
FIG. 3A

BALANCED CURRENT COLLECTOR PLATE

INTRODUCTION

The subject disclosure relates to electric vehicles. In particular, the invention relates to a balanced current collector plate for use in a battery pack of an electric vehicle.

Electric vehicles include battery packs that include several battery cells that are often connected in a configuration that includes both series and parallel connections. In large-capacity batteries made from a multitude of small cells, it is common for subgroups of cells to be connected in parallel. This is often accomplished by joining the similar terminals of the parallel cells to a single collector plate. The current from each cell joins in this collector plate and travels to the adjoining parallel group of cells. The cells of each group may be laid out such that the current from one cell sees a higher resistance than another cell in the group due to the difference in distance traveled through the collector plate. This may cause state-of-charge imbalances in the parallel group and reduce the usable capacity of the battery.

SUMMARY

In one exemplary embodiment a battery pack having a balanced current collector plate configured to connect a plurality of battery cells to one another is provided. The balanced current collector plate includes a terminal and a plurality of cell connection regions, each corresponding to one of the plurality of battery cells. Each of the plurality of cell connection regions includes one or more sidewalls, a cell connection tab that is configured to contact a terminal of a battery cell, and a cell fuse that is configured to electrically connect the cell connection tab to the balanced current collector plate. The geometry of each of the plurality of cell connection regions is configured to minimize a difference among the current draw between each of the plurality of battery cells and the terminal.

In addition to one or more of the features described herein, wherein the geometry of each of the plurality of cell connection regions includes one or more of an orientation of the cell fuse, a width of the cell fuse, a shape of the cell fuse and a width of the one or more sidewalls.

In addition to one or more of the features described herein, one or more apertures disposed between the plurality of cell connection regions.

In addition to one or more of the features described herein, a size and a location of the one or more apertures are configured to minimize a difference among the current draw between each of the plurality of battery cells and the terminal.

In addition to one or more of the features described herein, a jumper plate connected to two or more locations on the balanced current collector plate.

In addition to one or more of the features described herein, a size of the jumper plate and the two or more locations are configured to minimize a difference among the current draw between each of the plurality of battery cells and the terminal.

In addition to one or more of the features described herein, an insulator disposed between the jumper plate and the balanced current collector plate.

In another exemplary embodiment a battery pack of a vehicle is provided. The battery pack includes a plurality of battery cells, and a plurality of balanced current collector plates configured to connect the plurality of battery cells to one another. Each of the plurality of balanced current collector plates includes a plurality of cell connection regions, each corresponding to one of the plurality of battery cells. Each of the plurality of cell connection regions includes one or more sidewalls, a cell connection tab that is configured to contact a terminal of the corresponding battery cell, and a cell fuse that is configured to electrically connect the cell connection tab to the corresponding balanced current collector plate. A geometry of each of the plurality of cell connection regions is configured to minimize a difference among the current draw between each of the plurality of battery cells of the battery pack during use of the battery pack.

In addition to one or more of the features described herein, the geometry of each of the plurality of cell connection regions includes one or more of an orientation of the cell fuse, a width of the cell fuse, a shape of the cell fuse, and a width of the one or more sidewalls.

In addition to one or more of the features described herein, at least one of the plurality of balanced current collector plates further comprises one or more apertures disposed between the plurality of cell connection regions of the at least one of the plurality of balanced current collector plate.

In addition to one or more of the features described herein, a size and a location of the one or more apertures are configured to minimize a difference among the current draw between each of the plurality of battery cells of the battery pack during use of the battery pack.

In addition to one or more of the features described herein, at least one of the plurality of balanced current collector plates further comprises a jumper plate connected to two or more locations on the at least one of the plurality of balanced current collector plate.

In addition to one or more of the features described herein, a size of the jumper plate and the two or more locations are configured to minimize a difference among the current draw between each of the plurality of battery cells of the battery pack during use of the battery pack.

In addition to one or more of the features described herein, the at least one of the plurality of balanced current collector plates further comprises an insulator disposed between the jumper plate and the at least one of the plurality of balanced current collector plate.

In another exemplary embodiment a balanced current collector plate configured to connect a plurality of battery cells of a battery pack is provided. The balanced current collector plate includes a plurality of cell connection regions, each corresponding to one of the plurality of battery cells. Each of the plurality of cell connection regions includes one or more sidewalls, a cell connection tab that is configured to contact a terminal of a battery cell, and a cell fuse that is configured to electrically connect the cell connection tab to the balanced current collector plate. A geometry of each of the plurality of cell connection regions is configured to minimize a difference among the current draw of each of the plurality of battery cells of the battery pack during use of the battery pack.

In addition to one or more of the features described herein, the geometry of each of the plurality of cell connection regions includes one or more of an orientation of the cell fuse, a width of the cell fuse, a shape of the cell fuse, and a width of the one or more sidewalls.

In addition to one or more of the features described herein, one or more apertures disposed between the plurality of cell connection regions.

In addition to one or more of the features described herein, a size and a location of the one or more apertures are configured to minimize a difference among the current draw of each of the plurality of battery cells of the battery pack during use of the battery pack.

In addition to one or more of the features described herein, a jumper plate connected to two or more locations on the balanced current collector plate.

In addition to one or more of the features described herein, a size of the jumper plate and the two or more locations are configured to minimize a difference among the current draw of each of the plurality of battery cells of the battery pack during use of the battery pack.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 3A is a top view of a schematic diagram of a battery pack having balanced current collector plates in accordance with one or more embodiments of the present disclosure;

FIG. 3B is a bottom view of a schematic diagram of a battery pack having balanced current collector plates in accordance with one or more embodiments of the present disclosure:

DETAILED DESCRIPTION

The following description is merely exemplary in nature and is not intended to limit the present disclosure, its application or uses.

In accordance with an exemplary embodiment, a battery pack having a balanced current collector plate for an electric vehicle is provided. In exemplary embodiments, the balanced current collector plate is designed such that each cell, or sub-group of cells, of the battery pack has a balanced current draw. In exemplary embodiments, balancing the current draw from each battery cell of the battery pack is accomplished by altering the size and orientation of the connections between the battery cells and the current collector plate and the size and location of certain features of the collector plate to balance the resistance seen by the battery cells.

Figure 1:
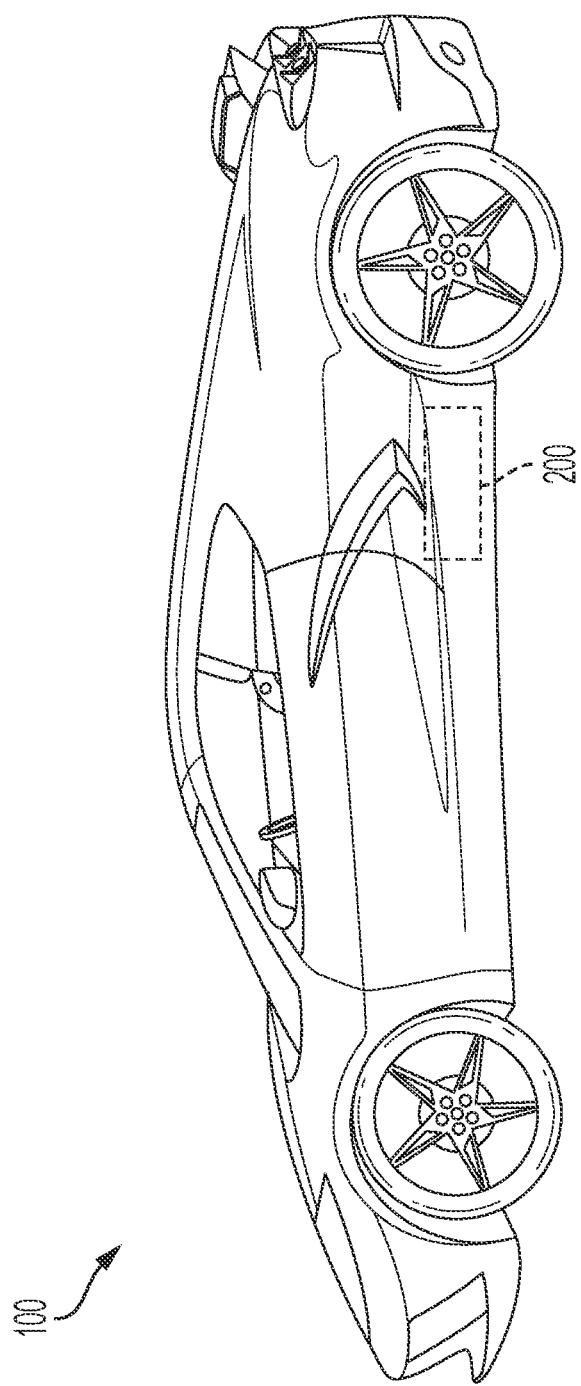
FIG. 1 is a schematic diagram of a vehicle for use in conjunction with one or more embodiments of the present disclosure.

Referring now to FIG. 1, a schematic diagram of a vehicle 100 for use in conjunction with one or more embodiments of the present disclosure is shown. The vehicle 100 includes a battery pack 200. In one embodiment, the vehicle 100 is a hybrid vehicle that utilizes both an internal combustion engine and an electric motor. In another embodiment, the vehicle 100 is an electric vehicle that only utilizes electric motors.

Figure 2:
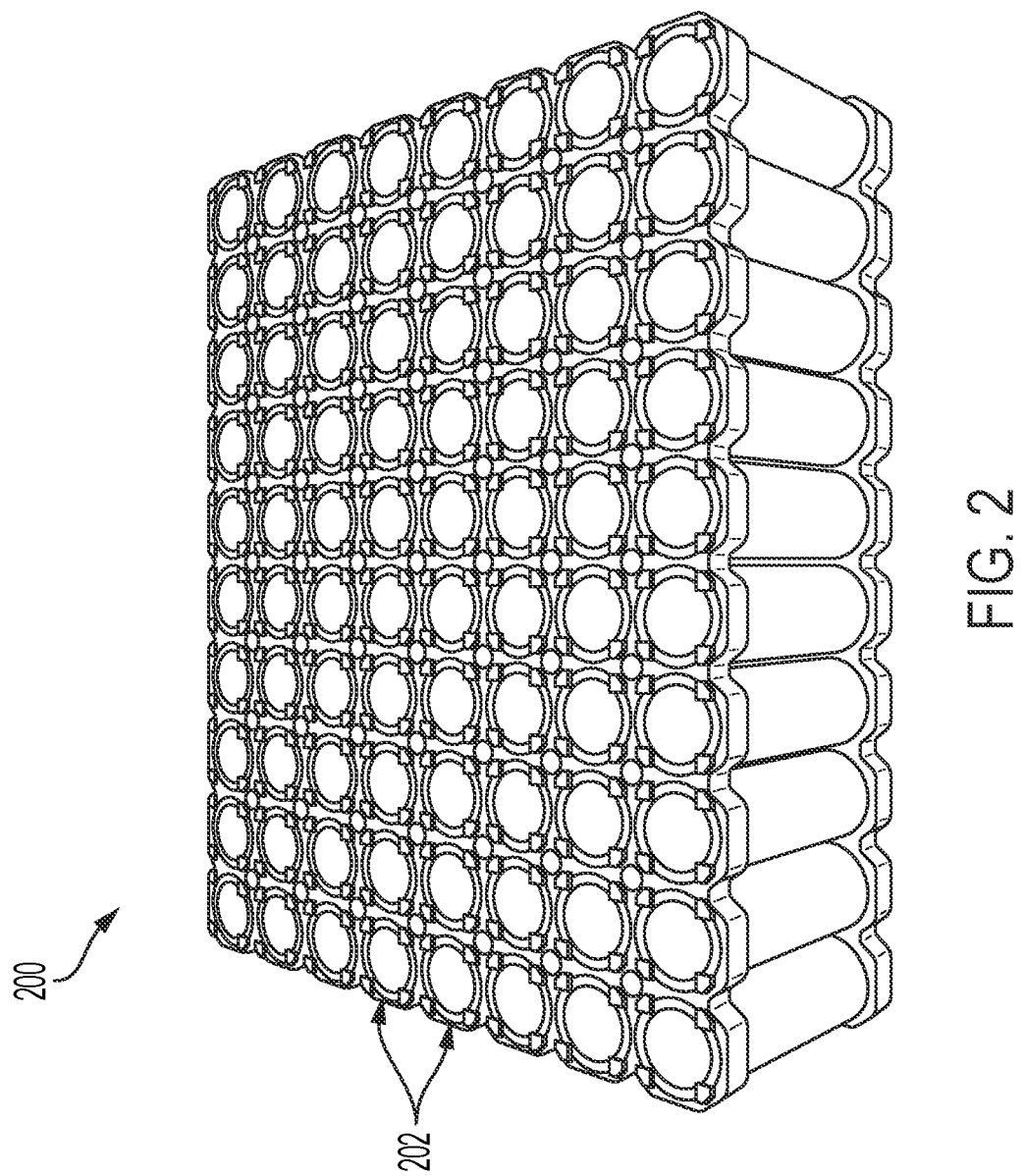
FIG. 2 is a schematic diagram of a battery pack for use in conjunction with one or more embodiments of the present disclosure.

Referring now to FIG. 2, a schematic diagram of a battery pack 200 for use in conjunction with one or more embodiments of the present disclosure is shown. As illustrated, the battery pack 200 includes a plurality of battery cells 202. In one embodiment, the plurality of battery cells 202 are grouped into four serially connected groups that each contain twenty cells that are connected in a parallel configuration. In exemplary embodiments, the plurality of battery cells 202 of the battery pack 200 are connected to each other via one or more collector plates (not shown).

Referring now to FIG. 3A, a top view of a battery pack 300 having balanced current collector plates in accordance with one or more embodiments of the present disclosure is shown. As illustrated, the battery pack 300 includes a plurality of battery cells 301, 302. In exemplary embodiments, the battery cells 301 are configured such that a negative terminal of the battery cells 301 is facing a first direction and the battery cells 302 are configured such that a positive terminal of the battery cells 301 is facing the first direction.

The battery pack 300 includes a first balanced current collector plate 304 that is configured to connect a group of battery cells 302 to each other in a parallel configuration. The battery pack 300 includes a second balanced current collector plate 306 that is configured to connect a group of battery cells 301 to each other in a parallel configuration, a group of battery cells 302 to each other in a parallel configuration, and to connect the group of battery cells 301 to the group of battery cells 302 in a series configuration. The battery pack 300 includes a third balanced current collector plate 308 that is configured to connect a group of battery cells 301 to each other in a parallel configuration. In exemplary embodiments, the first balanced current collector plate 304 includes one or more terminals 314 and the third balanced current collector plate 308 includes one or more terminals 316. The one or more terminals 314, 316 are configured to connect the battery pack 300 to an external source or load.

Referring now to FIG. 3B, a bottom view of the battery pack 300 having balanced current collector plates in accordance with one or more embodiments of the present disclosure is shown. The battery pack 300 includes a fourth balanced current collector plate 310 that is configured to connect a group of battery cells 301 to each other in a parallel configuration, a group of battery cells 302 to each other in a parallel configuration, and to connect the group of battery cells 301 to the group of battery cells 302 in a series configuration. The battery pack 300 includes a fifth balanced current collector plate 312 that is configured to connect a group of battery cells 301 to each other in a parallel configuration, a group of battery cells 302 to each other in a parallel configuration, and to connect the group of battery cells 301 to the group of battery cells 302 in a series configuration.

Figures 4A, 4B:
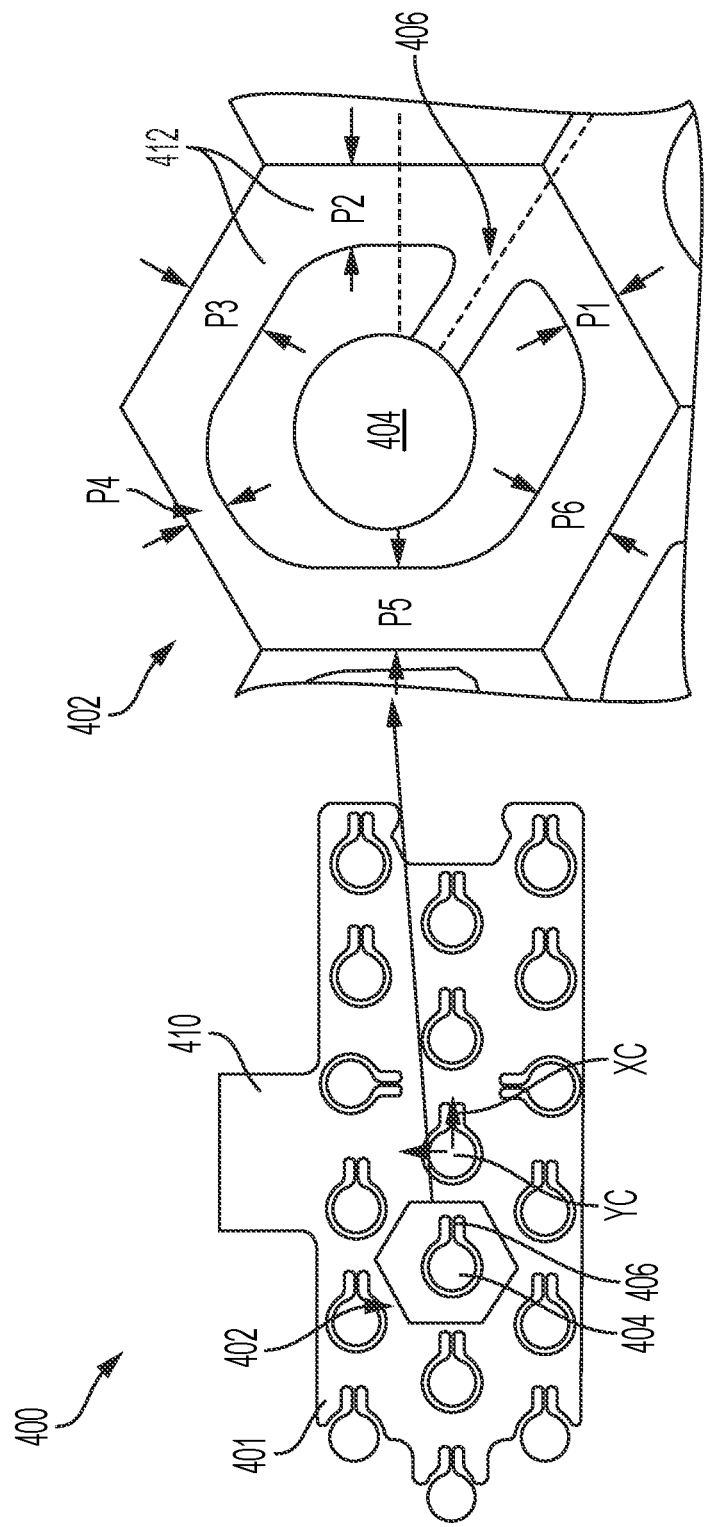
FIG. 4A is a schematic diagram of a balanced current collector plate in accordance with one or more embodiments of the present disclosure.
FIGS. 4B, 4C, and 4D are schematic diagrams of cell connection regions of a balanced current collector plate in accordance with one or more embodiments of the present disclosure.

Referring now to FIGS. 4A and 4B, schematic diagrams of a balanced current collector plate 400 in accordance with one or more embodiments of the present disclosure is shown. As illustrated, the balanced current collector plate 400 includes a terminal 410 for connecting the balanced current collector plate 400 to an external load or source. The balanced current collector plate 400 includes a body portion 401 that has a plurality of cell connection regions 402. Each cell connection region 402 includes a cell connection tab 404 that is configured to contact a terminal of a battery cell and a cell fuse 406 that is configured to electrically connect cell connection tab 404 to the body 401 of the balanced current collector plate 400. In exemplary embodiments, the geometry of each of the cell connection region 402 is configured such that a current drain through each of the cell connection tab 404 to the terminal 410 are approximately the same.

Figure 4D:
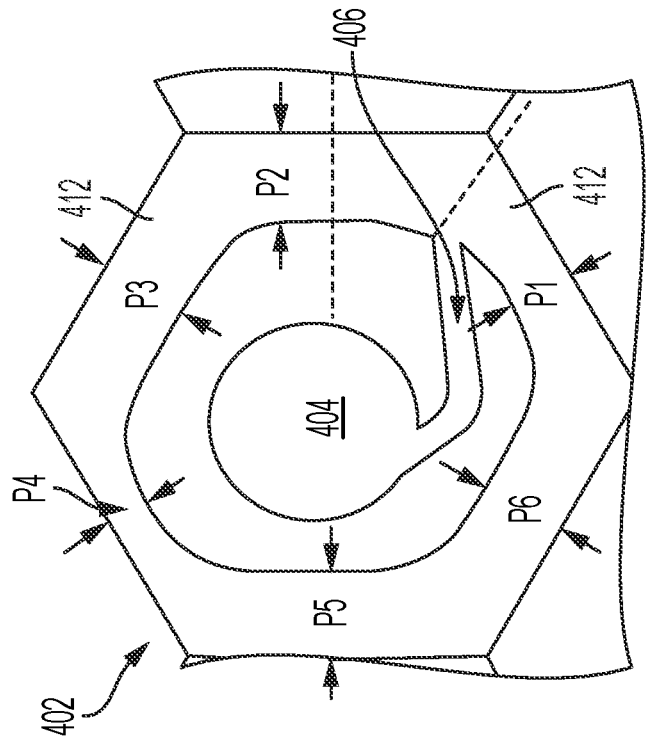
Figure 4C:
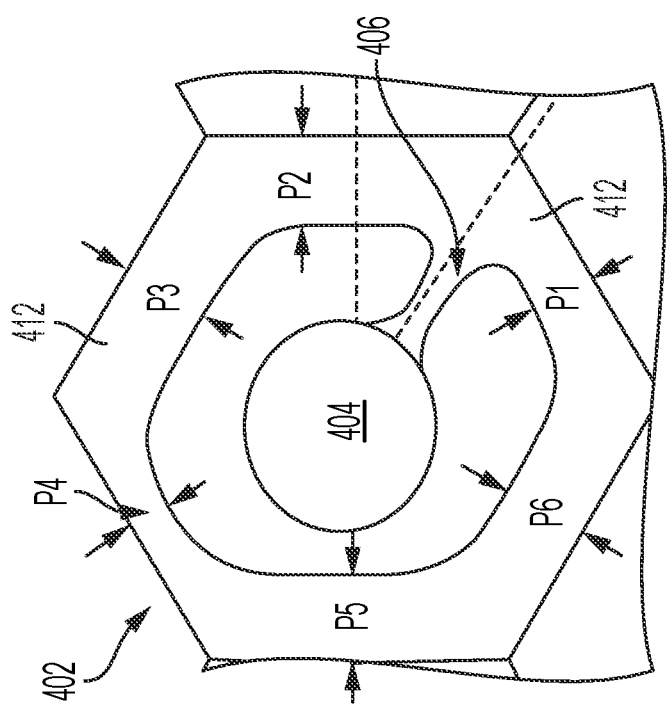

Referring now to FIGS. 4B, 4C and 4D, schematic diagrams of cell connection regions 402 of a balanced current collector plate in accordance with one or more embodiments of the present disclosure are shown. In exemplary embodiments, configuring the geometry of a cell connection region 402 includes setting a width (P1, P2, P3, P4, P5, and P6) of the sidewalls 412 of the cell connection region 402. In addition, configuring the geometry of a cell connection region 402 includes setting the shape, width, and orientation of the cell fuse 406. In one embodiment, as best shown in FIG. 4B, the cell fuse 406 may have a linear shape with an approximately constant width. In another embodiment, as best shown in FIG. 4C, the cell fuse 406 may have a linear shape with variable width. In a further embodiment, as best shown in FIG. 4D, the cell fuse 406 may have a non-linear shape with an approximately constant width. In exemplary embodiments, the orientation of the cell fuses 406 of the cell connection region 402 are non-uniform, (i.e., the cell fuses 406 do not point in the same directions as shown in FIG. 4A).

In exemplary embodiments, by adjusting the geometry of a cell connection region 402 the resistance between the cell fuse 406 of the cell connection region 402 and a terminal 410 of the balanced current collector plate 400 can be controlled. As a result, the current drain between the battery cell associated with the cell connection region 402 and the terminal 410 of the balanced current collector plate 400 can be adjusted to balance the current drain of each battery cell in the battery pack.

Figure 5:
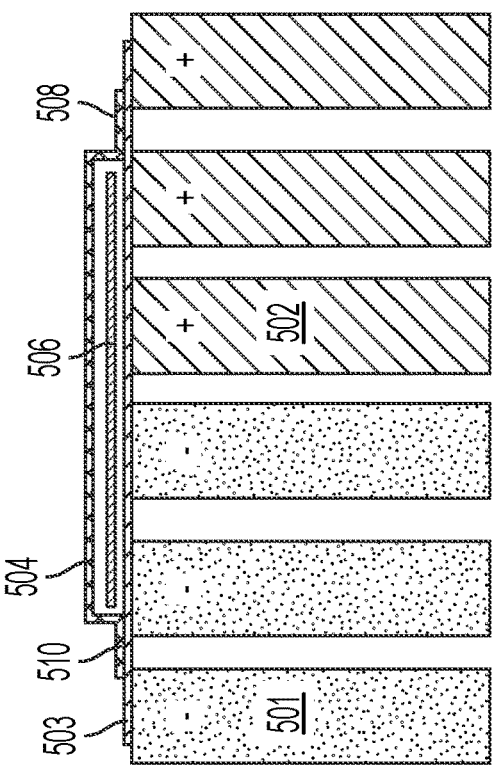
FIG. 5 is a side view of a schematic diagram of a battery pack having a balanced current collector plate in accordance with one or more embodiments of the present disclosure.

Referring now to FIG. 5, a side view of a schematic diagram of a battery pack 500 having balanced current collector plate 503 in accordance with one or more embodiments of the present disclosure is shown. As illustrated, the balanced current collector plate 503 is connected to a plurality of battery cells 501, 502. In exemplary embodiments, the battery cells 501 are configured such that a negative terminal of the battery cells 501 is connected to the balanced current collector plate 503 and the battery cells 502 are configured such that a positive terminal of the battery cells 501 is connected to the balanced current collector plate 503. In exemplary embodiments, the battery pack 500 includes a jumper plate 504 that is configured to connect to two or more locations 508, 510 on the balanced current collector plate 503 to provide an alternate current path between the two or more locations on the balanced current collector plate 503. The battery pack 500 also includes an insulator 506 that is disposed between the jumper plate 504 and the balanced current collector plate 503. In exemplary embodiments, one or more jumper plates 504 are used in a battery pack 500 to help balance the current draw from each battery cell of the battery pack.

Figure 6:
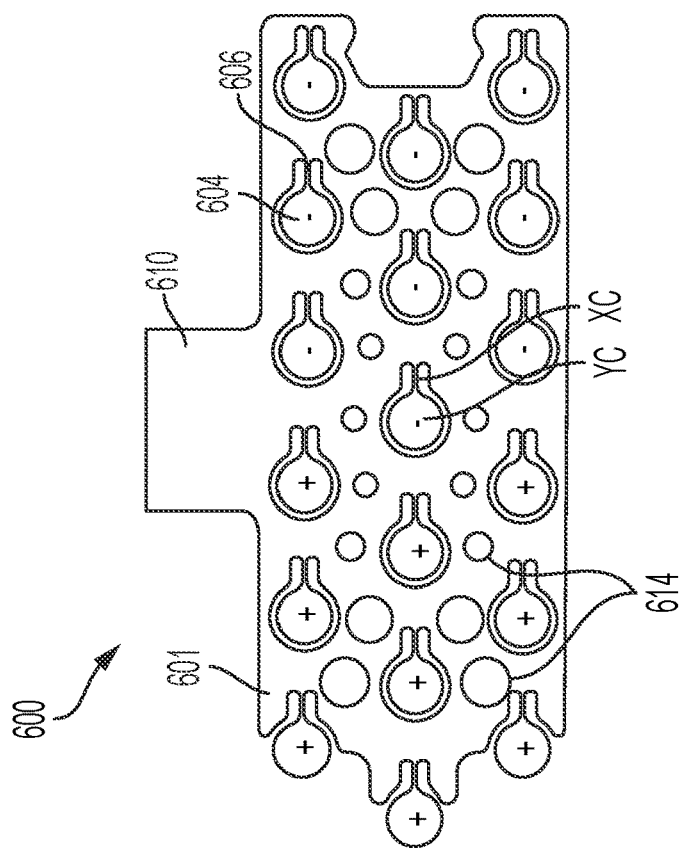
FIG. 6 is a schematic diagram of a balanced current collector plate in accordance with one or more embodiments of the present disclosure.

Referring now to FIG. 6, a schematic diagram of a balanced current collector plate 600 in accordance with one or more embodiments of the present disclosure is shown. The balanced current collector plate 600 is similar to the balanced current collector plate 400, shown in FIG. 4A, and includes body portion 601 that has a plurality of cell connection regions that each have a cell connection tab 604 and a cell fuse 606. The balanced current collector plate 600 includes a terminal 610 for connecting the balanced current collector plate 600 to an external load or source. The balanced current collector plate 600 also includes a plurality of apertures 614 that are disposed on the body portion 601 of the balanced current collector plate 600. In exemplary embodiments, the size and location of the apertures 614 are configured to reduce the metal between cell connection regions and therefore reduce the current flow between the cell connection regions. In exemplary embodiments, one or more the apertures 614 are disposed at various locations on the balanced current collector plate 600 to help balance the current draw from each battery cell of the battery pack.

Figure 7:
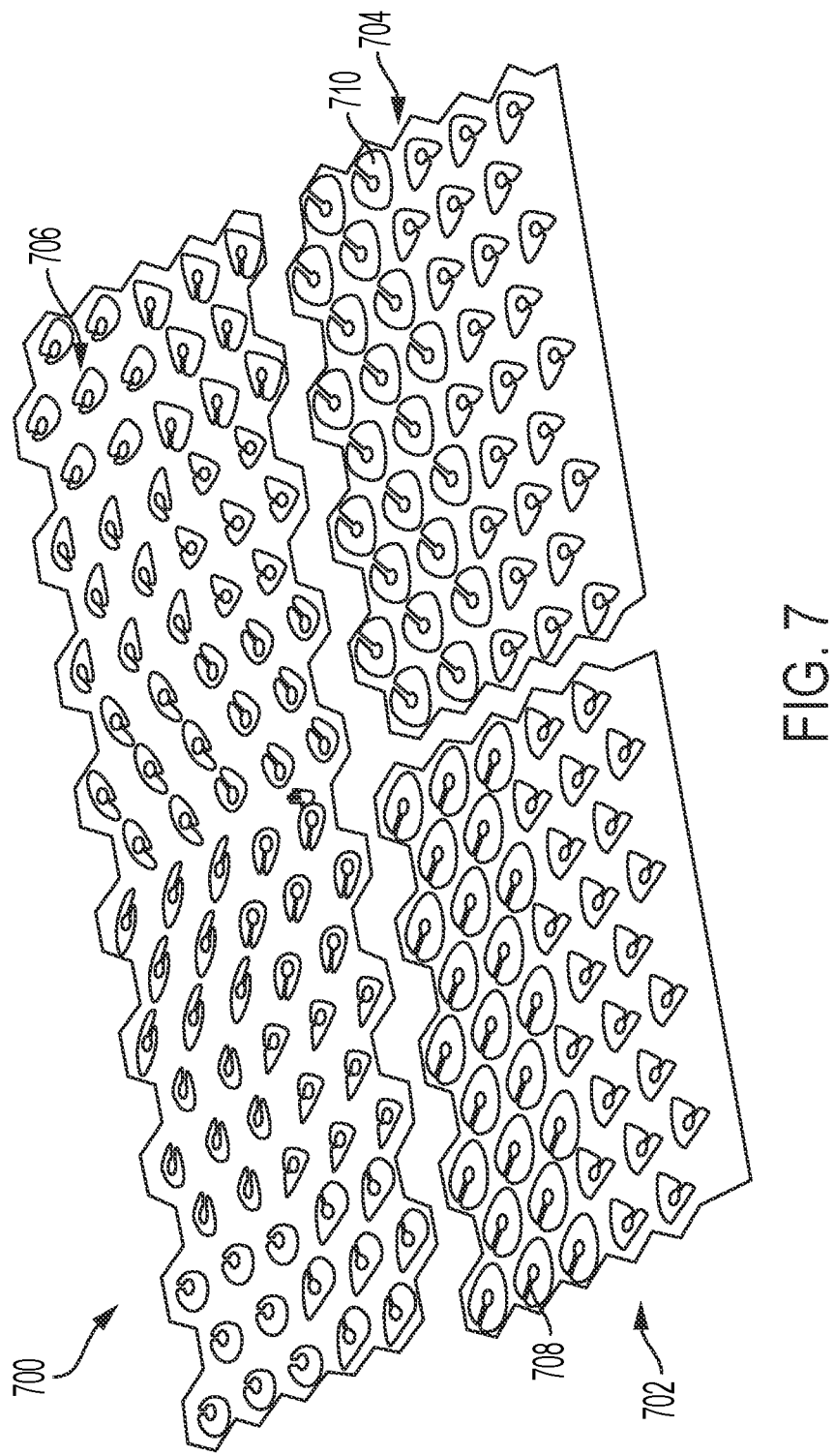
FIG. 7 is a schematic diagram of balanced current collector plates in accordance with one or more embodiments of the present disclosure.

Referring now to FIG. 7, a schematic diagram of balanced current collector plates 700, 702, and 704 in accordance with one or more embodiments of the present disclosure is shown. As illustrated, the balanced current collector plates 700, 702, and 704 each include a plurality of cell connection regions 706. Each cell connection region 706 includes a cell connection tab 710 that is configured to contact a terminal of a battery cell and a cell fuse 708 that is configured to electrically connect cell connection tab 710 to one of the balanced current collector plates 700, 702, and 704. As illustrated, the geometry of the cell connection regions 706 disposed across the balanced current collector plates 700, 702, and 704 varies significantly. As used herein, the geometry of the cell connection regions 706 includes a size of the cell connection tab 710, a width of the cell fuse 708, a direction of the cell fuse 708, and the width of the sidewalls of the cell connection region. In exemplary embodiments, the geometry of the cell connection regions 706 are configured to minimize a difference between the current draw from each battery cell of the battery pack.

In exemplary embodiments, the current collector plates for a battery pack are designed such that the current drawn from each of the battery cells in the battery pack are approximately the same. The current collector plates include one or more jumper plates that are configured to promote current flow between regions of the collector plates that would otherwise experience high resistance and therefore low current flow. Likewise, the current collector plates include one or more apertures that are disposed in regions of the current collector plate that have a high current flow to reduce the current flow in those regions. Furthermore, the current collector plates include cell fuses that connect the current collector plates to each battery cell and the geometry of each of the cell fuses are configured to equalize the current draw from each of the battery cells in the battery pack. In general, the size of the cell fuses is inversely related to the current density in the region of the collector plates where the cell fuse is located. For example, in areas of the collector plate with higher current density smaller cell fuses are used and in areas of the collector plate with a lower current density larger cell fuses are used. In addition to varying the size of the fuses, the orientation of the fuses is also configured to equalize the current draw from each of the battery cells in the battery pack.

In exemplary embodiments, an optimization program is used to generate a design of the collector plates for a battery pack. The optimization program is configured to receive a design of a battery pack, including a number of battery cells, a configuration of the battery cells, a desired connection between the battery cells, and a location of the terminal for the battery pack. The optimization program is configured to determine all the current collector plate parameters, so an optimal current distribution is achieved. In exemplary embodiments, the optimal current distribution is a current distribution that minimizes the difference in the current draw among the battery cells of the battery pack. The current collector plate parameters include the geometry of the cell fuses for each battery cell, the geometry of each the current collector plate (i.e., a shape and thickness of the collector plate), the location and size of apertures disposed on the current collector plates, and the size and location of one or more jumper plates connected to the current collector plates.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A balanced current collector plate configured to connect a plurality of battery cells to one another, the balanced current collector plate comprising:
    a terminal; and
    a plurality of cell connection regions, each corresponding to one of the plurality of battery cells, wherein each of the plurality of cell connection regions comprises:
    one or more sidewalls;
    a cell connection tab that is configured to contact a terminal of a battery cell;
    a cell fuse that is configured to electrically connect the cell connection tab to the balanced current collector plate; and
    one or more apertures disposed between the plurality of cell connection regions,
    wherein a geometry of each of the plurality of cell connection regions is configured to minimize a difference among the current draw between each of the plurality of battery cells and the terminal, and
    wherein a size and a location of the one or more apertures are configured to minimize a difference among the current draw between each of the plurality of battery cells and the terminal.

2. The balanced current collector plate of claim 1, wherein the geometry of each of the plurality of cell connection regions includes one or more of:
    an orientation of the cell fuse;
    a width of the cell fuse;
    a shape of the cell fuse; or
    a width of the one or more sidewalls.

3. The balanced current collector plate of claim 1, further comprising a jumper plate connected to two or more locations on the balanced current collector plate.

4. The balanced current collector plate of claim 3, wherein a size of the jumper plate and the two or more locations are configured to minimize a difference among the current draw between each of the plurality of battery cells and the terminal.

5. The balanced current collector plate of claim 3, further comprising an insulator disposed between the jumper plate and the balanced current collector plate.

6. A battery pack of a vehicle, the battery pack comprising:
    a plurality of battery cells;
    a plurality of balanced current collector plates configured to connect the plurality of battery cells to one another, each of the plurality of balanced current collector plates comprising:
    a plurality of cell connection regions, each corresponding to one of the plurality of battery cells, wherein each of the plurality of cell connection regions comprises:
    one or more sidewalls;
    a cell connection tab that is configured to contact a terminal of a corresponding battery cell; and
    a cell fuse that is configured to electrically connect the cell connection tab to a corresponding balanced current collector plate,
    wherein a geometry of each of the plurality of cell connection regions is configured to minimize a difference among the current draw between each of the plurality of battery cells of the battery pack during use of the battery pack, and
    wherein at least one of the plurality of balanced current collector plates further comprises a jumper plate connected to two or more locations on the at least one of the plurality of balanced current collector plates.

7. The battery pack of claim 6, wherein the geometry of each of the plurality of cell connection regions includes one or more of:
    an orientation of the cell fuse;
    a width of the cell fuse;
    a shape of the cell fuse; or
    a width of the one or more sidewalls.

8. The battery pack of claim 6, wherein at least one of the plurality of balanced current collector plates further comprises one or more apertures disposed between the plurality of cell connection regions of the at least one of the plurality of balanced current collector plates.

9. The battery pack of claim 8, wherein a size and a location of the one or more apertures are configured to minimize a difference among the current draw between each of the plurality of battery cells of the battery pack during use of the battery pack.

10. The battery pack of claim 6, wherein a size of the jumper plate and the two or more locations are configured to minimize a difference among the current draw between each of the plurality of battery cells of the battery pack during use of the battery pack.

11. The battery pack of claim 6, wherein the at least one of the plurality of balanced current collector plates further comprises an insulator disposed between the jumper plate and the at least one of the plurality of balanced current collector plates.

12. A balanced current collector plate configured to connect a plurality of battery cells of a battery pack, the balanced current collector plate comprising:
a plurality of cell connection regions, each corresponding to one of the plurality of battery cells, wherein each of the plurality of cell connection regions comprises:
one or more sidewalls;
a cell connection tab that is configured to contact a terminal of a battery cell; and
a cell fuse that is configured to electrically connect the cell connection tab to the balanced current collector plate,
wherein a geometry of each of the plurality of cell connection regions is configured to minimize a difference among the current draw of each of the plurality of battery cells of the battery pack during use of the battery pack, and
wherein the geometry of at least three of the plurality of cell connection regions are different from one another.

13. The balanced current collector plate of claim 12, wherein the geometry of each of the plurality of cell connection regions includes one or more of:
an orientation of the cell fuse;
a width of the cell fuse;
a shape of the cell fuse; or
a width of the one or more sidewalls.

14. The balanced current collector plate of claim 12, further comprising one or more apertures disposed between the plurality of cell connection regions.

15. The balanced current collector plate of claim 14, wherein a size and a location of the one or more apertures are configured to minimize a difference among the current draw of each of the plurality of battery cells of the battery pack during use of the battery pack.

16. The balanced current collector plate of claim 12, further comprising a jumper plate connected to two or more locations on the balanced current collector plate.

17. The balanced current collector plate of claim 16, wherein a size of the jumper plate and the two or more locations are configured to minimize a difference among the current draw of each of the plurality of battery cells of the battery pack during use of the battery pack.

18. The balanced current collector plate of claim 12, wherein the geometry of each of the plurality of cell connection regions is determined based on a calculated resistance between the cell connection tab and a terminal of the balanced current collector plate.

19. The balanced current collector plate of claim 12, wherein the cell fuse of at least one of the plurality of cell connection regions comprises a non-linear shape.

20. The balanced current collector plate of claim 12, wherein the geometry of at least one of the plurality of cell connection regions is optimized using a computer-implemented optimization program to minimize a difference among the current draw of each of the plurality of battery cells.

* * * * *